United States Patent [19]

Müller-Erwig et al.

[11] Patent Number: 4,586,410

[45] Date of Patent: May 6, 1986

[54] APPARATUS FOR PRODUCING OPEN-SIDED V-BELTS

[75] Inventors: Horst Müller-Erwig, Neustadt; Wilhelm Brand, Hanover, both of Fed. Rep. of Germany

[73] Assignee: Hermann Berstorff Maschinenbau GmbH, Fed. Rep. of Germany

[21] Appl. No.: 721,945

[22] Filed: Apr. 11, 1985

[30] Foreign Application Priority Data

Apr. 18, 1984 [DE] Fed. Rep. of Germany ....... 3414673
Nov. 30, 1984 [DE] Fed. Rep. of Germany ....... 3443685

[51] Int. Cl.⁴ .............................................. B26D 7/14
[52] U.S. Cl. ......................................... 83/175; 83/18; 83/817
[58] Field of Search .................. 83/175, 18, 814, 817, 83/925 EB

[56] References Cited

U.S. PATENT DOCUMENTS 1,611,781 12/1926 Russell et al. .................... 83/175 X
3,818,789 6/1974 Vargo ................................. 83/175 X
4,488,465 12/1984 Brand et al. ........................... 83/175

FOREIGN PATENT DOCUMENTS 3128111 10/1984 Fed. Rep. of Germany .

Primary Examiner—Donald R. Schran
Attorney, Agent, or Firm—Schwartz, Jeffery, Schwaab, Mack, Blumenthal & Evans

[57] ABSTRACT

An apparatus for producing open-sided V-belts by cutting from a vulcanized, sleeve-shaped roll while the roll is being tensioned by being passed over two drivable rollers. By unilaterally pivoting one of the rollers and by providing a stop member which abuts the roll, the roll is tensioned by the desired amount and runs smoothly around the rollers so that an accurate cutting operation can be achieved by cutters.

6 Claims, 2 Drawing Figures

APPARATUS FOR PRODUCING OPEN-SIDED V-BELTS

FIELD OF THE INVENTION

The present invention relates to an apparatus for producing open sided V-belts. More particularly, the invention relates to a method and apparatus for producing open-sided V-belts from vulcanised sleeve-shaped rolls of material.

BACKGROUND OF THE INVENTION AND PRIOR ART DISCUSSION

In German Offenlegungsschrift No. 3 128 111, there is described an apparatus for producing open-sided V-belts from a sleeve-shaped roll which has been prevulcanised. The roll is located over two rollers which are axis-parallel to one another. One of the rollers is subsequently moved away from the other roller so as to increase the axial spacing between the rollers. The roll of material is tensioned during such movement and, whilst tensioned, is cut into individual V-belts which do not require any further processing treatment.

It is necessary to tension the vulcanised roll on the rollers for the cutting operation, but such tensioning has, in practice, proved difficult to achieve. A very high degree of accuracy is needed when cutting V-belt blanks which are already vulcanised. The blanks are in the form of a sleeve-shaped roll. The cutting operation has to be performed within a tolerance of 0.1 mm. This is because, if the belts are used in motor vehicles, any greater inaccuracy in cutting causes the V-belts to produce considerable and unacceptable background noise.

V-belt blanks which are already vulcanised are, obviously, extremely rigid. Additional problems arise when trying to cut the blanks because it is formed from rubber layers or plies which are highly resistant to abrasion. The V-belts need not, however, be pre-vulcanised. Instead, they may be covered with a coating in the form of a very stable, rubberised or rubber-coated fabric to increase abrasion resistance. Such a manufacturing process is, however, complicated because every single V-belt has to be covered with a coating so that it can then be subjected to a vulcanising process in a mould. During vulcanisation in the mould, inaccuracies in respect of dimensions can, in the main, be compensated for with the result that highly accurate cutting operations for unvulcanised V-belts are not necessary.

Due to the disadvantages of the coating stage of this method, there is an increasing tendency for open-sided V-belts to be produced by cutting a vulcanised roll.

However, in adopting this approach, it is necessary to overcome the major problem of the guiding of the rotating, vulcanised roll in a very smooth manner so that an accurate cutting can be achieved.

OBJECT OF THE INVENTION

The invention seeks to provide an apparatus for producing open-sided V-belts which ensures that the roll to be cut, which is rotated around rollers at high speed, is guided very smoothly so that the roll can be accurately guided and tensioned, thereby permitting a number of equally accurately dimensioned belts to be cut from one roll in a continuous manner.

SUMMARY OF THE INVENTION

According to the present invention, there is provided an apparatus for producing open-sided V-belts by cutting from a vulcanised, sleeve-shaped roll or winding, comprising support means for the roll, the support means comprising a first fixedly mounted roller and a second, pivotable tensioning roller disposed below the fixedly mounted roller, the roll being tensioned by pivotal movement of the tensioning roller, and cutter means for cutting the roll into individual V-belts wherein the tensional roller lies in a plane parallel to the stationary roller and is pivotable in such plane, the pivot point for the tensioning roller lying adjacent one end face of the tensional roller, and in that a stop member, which, in use, supports and abuts against the rotating roll, is disposed adjacent the end region of the rollers remote from the pivot point.

The pivotability of the tensioning roller causes the leading edge of the roll, that is to say, the edge remote from the pivot axis to extend unilaterally due to the fact that the end of the pivotal roller remote from the point axis has been displaced through the greatest distance and because the two rollers lie in parallel planes and remain so during the pivotal movement. As the roll rotates around the rollers (at a speed of up to 1,000 revolutions per minute), a component of movement in the direction of the stop member is forced upon the roll. This is because the roll is carried along by the roller surface of the tensioning roller as it passes therearound and because the tensioning roller has, itself, been out of vertical alignment with the fixedly mounted roller. Upon leaving the roller surface and having reversed direction through 180° by passing therearound, the roll has been carried along over a short distance in the direction of the stop member. This is in a direction towards the end region of the roller in which the stop member is located.

The consequence of the roll being displaced along the roller through this short distance is that the rotating roll travels axially along the tensioning roller in a direction towards the stop member, but in dependence upon its rotational direction.

Because the roll moves towards the stop member and the edge abuts thereagainst the roll moves in an extremely smooth manner.

A variable, unilateral increase in the frictional connection of the roll is achieved by locating the tensioning roller in a plane parallel to the fixedly mounted roller and by making it pivotal through varying amounts about a pivotal point located adjacent one end face of the tensioning roller, whilst remaining in such parallel plane. It is possible, therefore, to set the pivotal angle in dependence upon the characteristics of the roll to be cut. In this respect, parameters such as the wall thickness, the reinforcement, the length, the elasticity and the layer structure of the roll may be taken into account.

Preferably, the stop member is in the form of an advancing mechanism, the mechanism being displaceable by means of spindle drive and, in use, advances the roll in a direction towards the cutter means.

This is particularly advantageous because the stop member may simultaneously be used for advancing the rotating roll in the direction of the cutter means. When a V-belt is severed from the roll and discharged, usually by gravity, the advancing mechanism is used to apply pressure to the edge of the rotating roll remote from the cutter means so that a further belt may be cut from the roll.

By so doing, the roll rotates smoothly because, in each operational phase, the roll moves towards the stop member in the form of an advancing mechanism, due to the unilateral extension and the direction of motion. In this way, the roll can be accurately guided.

Desirably, the advancing mechanism is in the form of a linear slider member and has a pressure measurement device associated therewith.

Advantageously, a measurement amplifier is interposed between the linear slider member and the pressure measurement device.

Further preferably, the advancing mechanism comprises a roller mounted upstream of a linear slider member and is so located as to act upon the lateral edge of the rotating roll, the slider member and its associated roller being displaceable in a direction towards the roll. By so doing, an additional value is obtained for the degree of tension and, hence, for the extent of unilateral elongation of the roll. Such an additional value may be transmitted to a computer, for example, so that it can be reproduced when desired. In addition, on the basis of such values, a computer may also determine the desired pivotal angle for a particular roll and such an angle may be set by suitable means.

If, in addition, the computer controls the stepwise advancing movement of the rotating roll over a distance which corresponds to the width of one cut V-belt by the advancing means it is also possible for the apparatus according to the invention to be operated automatically.

BRIEF DESCRIPTION OF THE DRAWINGS

One embodiment of an apparatus for producing open-sided V-belts will be described further, by way of example, with reference to the accompanying drawings, in which.

DESCRIPTION OF PREFERRED EMBODIMENT

Figure 1:
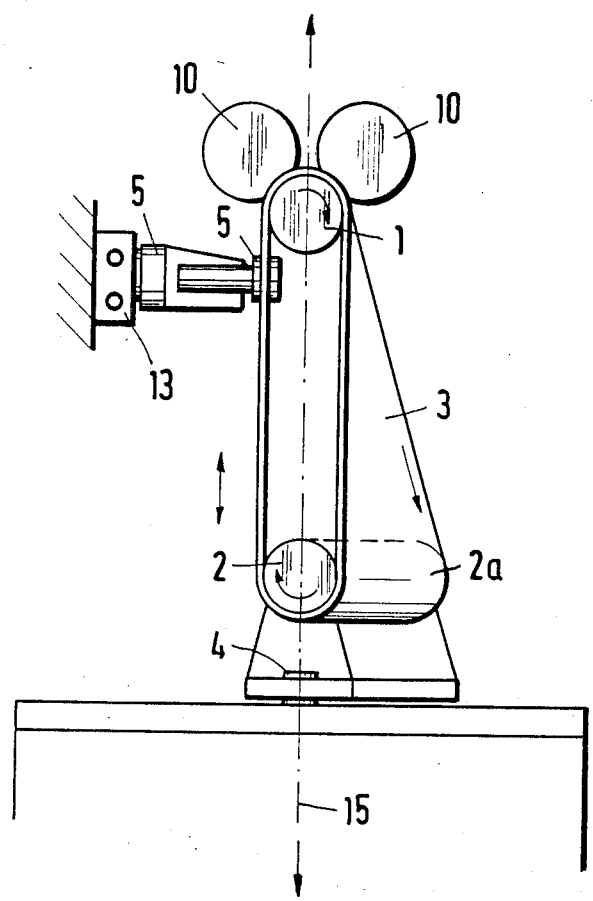
FIG. 1 is a schematic side elevational view of the apparatus, but showing only the component parts thereof which are relevant to the present invention.

In the drawings, there is shown an apparatus for cutting V-belts from a vulcanised roll 3 of material. The apparatus comprises a pair of rollers 1 and 2. The rollers are rotatable and the roller 2 acts as a tensioning roller for the roll of material. The roller 1 is supported at one of its ends and is neither pivotable nor vertically adjustable.

The roller 2 is, however, pivotal about a pivot point 4. This is achieved by mounting the roller 2 in two bearings 6 disposed in the end region of the roller 2 remote from the pivot point 4. The bearings 6 are disposed on a frame member 7 which is provided with two wheels 8 and 9 which run in a recessed track (not shown). The frame member 7 is pivotally mounted about a vertical axis in the region of the pivot point 4. Accordingly, the roller 2 is mounted in a cantilever manner.

If the roller 2 is pivoted about the pivot point 4, the roll 3 is subjected to increased frictional wear in the edge region 3a thereof. The drive of the roller 2 simultaneously causes the roll 3 to move along the external surface 2a of the roller 2.

Two circular cutters 10, which each rotate at high speed, are disposed in the region of the fixed roller 1 and are used to cut a belt from the roll 3 as it passes over the roller 1. Obviously, whenever a belt is cut from the roll 3, it is necessary to ensure that the remainder of the roll 3 is moved into the correct position for the next belt to be cut. This can be achieved by providing a stop member 5 which abuts against the edge 3a of the roll 3 and causes the roll 3 to be conveyed in the direction of the cutters 10 over a distance which corresponds to the width of the belt which has been cut.

To provide frictionally advantageous abutment of the stop member 5 with the rotating roll 3, the head of the stop member 5 may have a roller 5a mounted thereon.

A measuring device 11 may be connected to stop member 5, with a measurement amplifier 12 interposed therebetween, so that, when the stop member 5 presses against the edge 3a of the roll 3, the pressure is measured and can be reproduced.

The stop member 5, that is to say, the advancing mechanism 5, is made movable in the direction of the double-headed arrow 14 by means of a linear slider member 13. This slider member 13 is displaceable by means of a spindle drive (not shown).

In use, the frame 7 is pivoted through a determined angle. This angle is dependent upon, for example, the thickness and construction of the roll 3. The pivotal movement of the frame determines the tensioning force which is applied to the roll. The roll 3 is also subjected to a definite torsional movement and moves towards the roller 5a of the stop member 5. Since the roll 3 rotates smoothly, the individual V-belts are severed by means of circular cutters 10, and the stop member in the form of an advancing mechanism 5 produces an advancing step after each cutting operation.

The roll 3 moves along the external surface 2a of the outwardly pivoted roller 2. The roller 2 is pivoted in a plane which is parallel to the axis of the stationary roller 1 about the pivot point 4.

Figure 2:
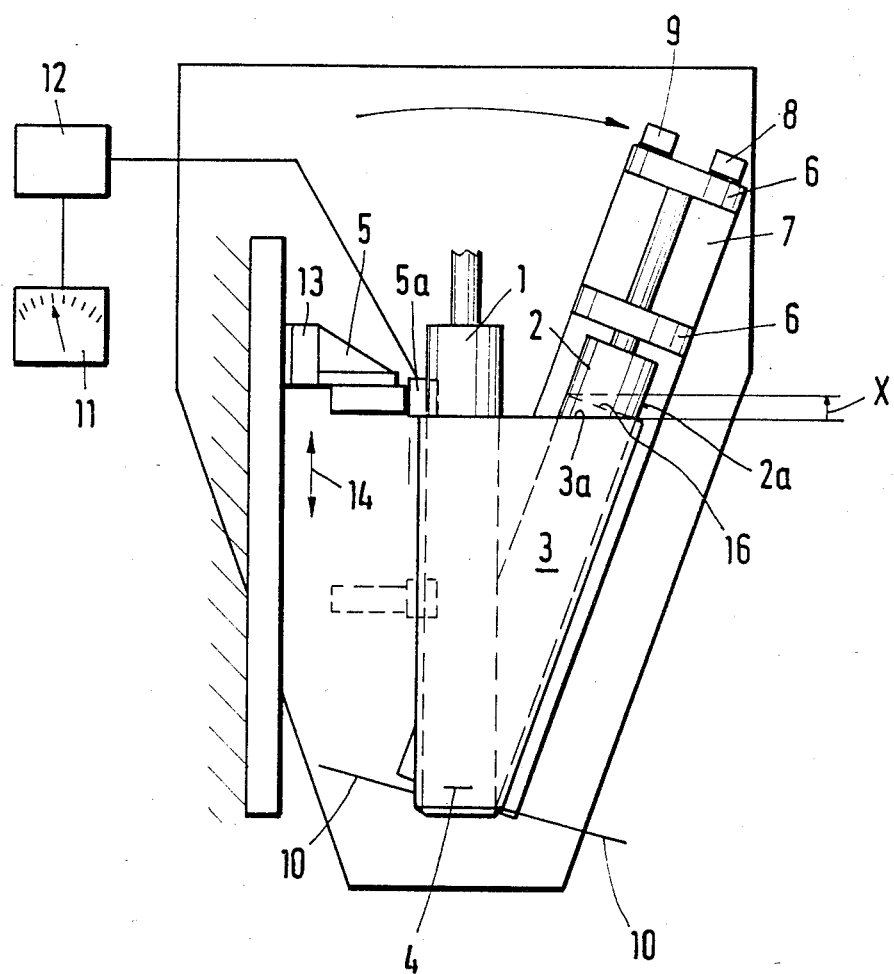
FIG. 2 is a plan view from above of the embodiment of the apparatus shown in FIG. 1.

Due to the above-mentioned rotational movement of the roll 3, the roll 3 encounters the external surface 2a of the roller 2 when its direction of travel is to be reversed through 180°. The roll 3 therefore endeavours to travel in the direction of the stop member 5 whilst its direction of travel is being reversed. This situation is indicated by the dotted line 16 on roller 2 in FIG. 2. When the roller 2 is in its pivotal position as illustrated, the roll travels a distance X in the direction of the stop member 5, although, in the drawings, the amount of movement has been exaggerated for the sake of clarity.

We claim:

1. An apparatus for cutting open-sided V-belts from a vulcanised, sleeve-shaped roll, having first and second opposed lateral edges, roll support means comprising first and second rotatable roller means receiving said sleeve-shaped roll thereon, means mounting said first roller means for rotation in a non-vertically displaceable, non-pivotal manner, said first and second roller means each having corresponding first and second opposed end regions, roller support means carrying said second roller means for rotation, said roller support means comprising a base member, pivot axis means mounting said base member for permitting pivotal movement of said base member about said axis, said pivot axis being located closely adjacent said first end region of said second roller means, bearing means mounted on said base member, said bearing means rotatably receiving said second end region of said second roller means, said first and second roller means lying in planes parallel to one another and whereby said pivotal movement of said base member carrying said second roller means causes said second roller means to remain in said plane parallel to said first roller means, and whereby, when said roll is disposed on said roll support means, said first lateral edge of said roll is disposed in said first end region of said roller and said second lateral edge of said roll is disposed in said second end region of said rollers, stop means engaging said roll, said stop means acting on said second lateral edge of said roll and tending to move said second lateral edge of said roll towards said first end region of said rollers and cutter means disposed adjacent said first roller means for cutting said roll into belts.

2. An apparatus as recited in claim 1, wherein said stop member comprises an advancing mechanism, the apparatus additionally comprising spindle drive means operatively connected to said advancing means to cause said mechanism to advance said roll in a direction towards said cutter means.

3. An apparatus as recited in claim 1, wherein said stop member comprises a linear slide means, said linear slide means acting on said second lateral edge of said roll, and means operatively connected to said linear slide for measuring the pressure applied by said slide means to said lateral edge of said roll.

4. An apparatus as recited in claim 2, wherein said advancing mechanism comprises linear slider means and further roller means mounted on said linear slider means, said further roller means acting on said second lateral edge of said roll and being displaceable in a direction towards said second lateral edge.

5. An apparatus as recited in claim 3, additionally comprising amplifier means interposed between said linear slider means and said pressure measuring means and operatively connected both to said slider means and said measuring means.

6. An apparatus as recited in claim 2, wherein said advancing unit advances said rotating roll in the direction of said cutter means through a distance corresponding to the width on one cut belt.

* * * * *